(12) United States Patent
Vidal et al.

(10) Patent No.: US 10,675,923 B2
(45) Date of Patent: Jun. 9, 2020

(54) PNEUMATIC SYSTEM FOR INFLATING A WHEEL, INTEGRATED TO A DRIVEN AXLE

(71) Applicant: Poclain Hydraulics Industrie, Verberie (FR)

(72) Inventors: Stephane Vidal, Verberie (FR); Marc Perot, Verberie (FR); Sylvain Michon, Verberie (FR)

(73) Assignee: POCALIN HYDRAULICS INDUSTRIE, Verberie (FR)

( * ) Notice: Subject to any disclaimer, the term of this patent is extended or adjusted under 35 U.S.C. 154(b) by 749 days.

(21) Appl. No.: 15/183,698

(22) Filed: Jun. 15, 2016

(65) Prior Publication Data
US 2016/0368329 A1    Dec. 22, 2016

(30) Foreign Application Priority Data

Jun. 16, 2015 (FR) .................................... 15 55500

(51) Int. Cl.
*B60C 23/00* (2006.01)
*F16C 33/72* (2006.01)
(Continued)

(52) U.S. Cl.
CPC .......... *B60C 23/003* (2013.01); *B60C 23/001* (2013.01); *F16C 33/726* (2013.01);
(Continued)

(58) Field of Classification Search
CPC ... B60C 23/003; B60C 23/004; B60C 23/001; B60C 23/005; F16C 33/726
(Continued)

(56) References Cited

U.S. PATENT DOCUMENTS 5,203,391 A * 4/1993 Fox ................. B60C 23/003
                                                152/415
6,325,123 B1 * 12/2001 Gao ................. B60C 23/003
                                                152/416
(Continued)

FOREIGN PATENT DOCUMENTS

EP    2803506 A1    11/2014
FR    2465602 A1    3/1981
(Continued)

OTHER PUBLICATIONS

Search Report and Written Opinion in French Application No. 1555500 dated Apr. 14, 2016, with English translation coversheet. 7 pages.

*Primary Examiner* — Scott A Browne
(74) *Attorney, Agent, or Firm* — Womble Bond Dickinson (US) LLP

(57) ABSTRACT

The invention relates to a system for pneumatically powering a wheel comprising a bearing support (10), a shaft (20) comprising a hub-forming end (21) which extends radially (Y), at least one set of rolling bearings (30), wherein the system further comprises a chamber (C) formed by the hub-forming end (21), the bearing support (10), a rolling bearing seal (40) and a chamber seal (50), a primary channel (60) crossing the bearing support (10) and opening into the chamber (C), a secondary channel (70) crossing the hub-forming end (21) and opening into the chamber (C), wherein seals seal the cavity (C) in order to let air pass from the primary channel to the secondary channel via the cavity (C).

14 Claims, 14 Drawing Sheets

Figure 1:
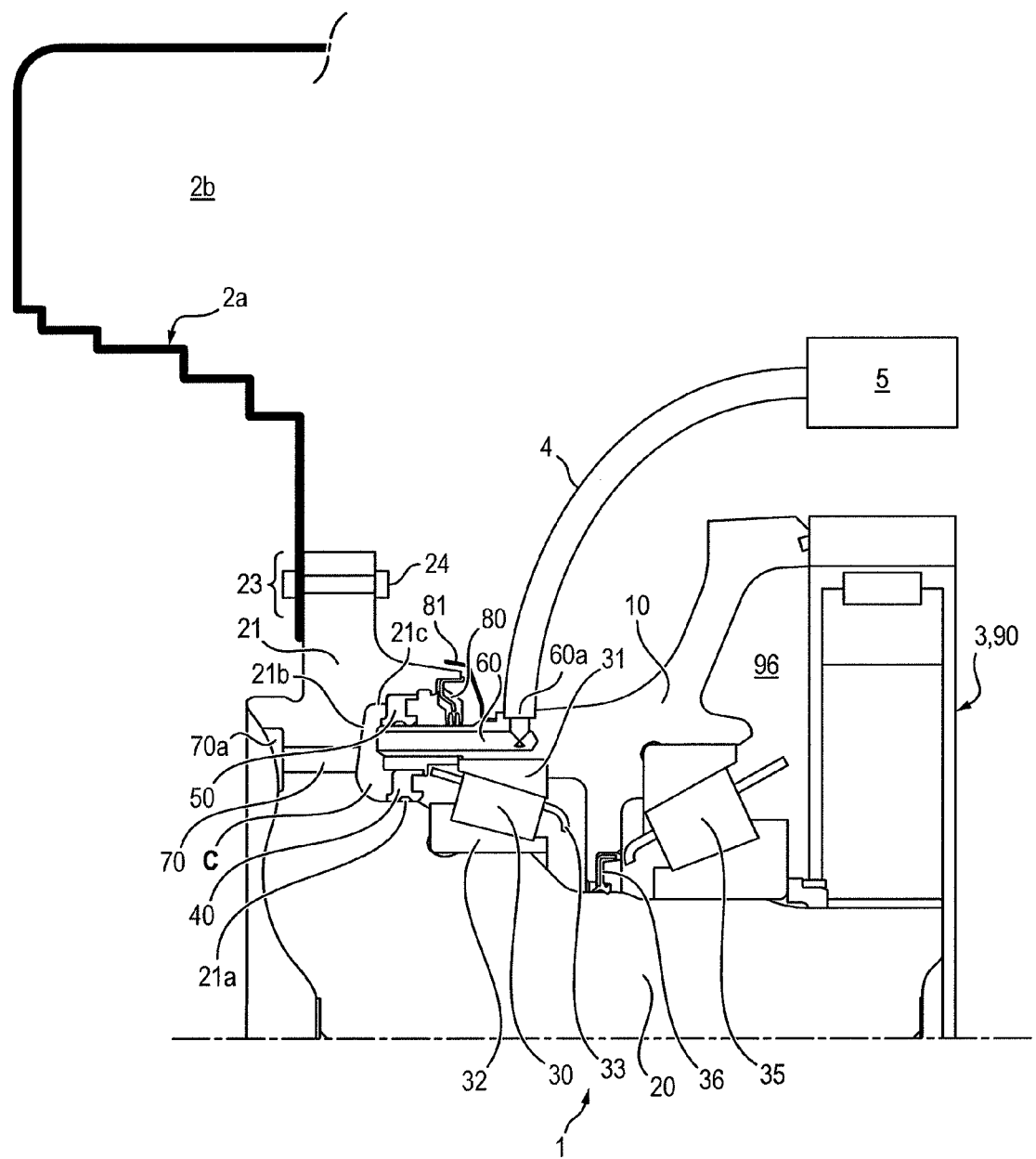

(51) Int. Cl.
  *F16C 33/66* (2006.01)
  *B60K 7/00* (2006.01)
  *F16C 43/04* (2006.01)
  *B60B 27/00* (2006.01)
  *F16C 19/54* (2006.01)

(52) U.S. Cl.
  CPC ....... *B60B 27/0047* (2013.01); *B60B 27/0073* (2013.01); *B60K 7/0015* (2013.01); *F16C 19/548* (2013.01); *F16C 33/6603* (2013.01); *F16C 33/6637* (2013.01); *F16C 43/04* (2013.01); *F16C 2326/02* (2013.01)

(58) Field of Classification Search
  USPC .......................................... 152/415, 416, 417
  See application file for complete search history.

(56) References Cited

U.S. PATENT DOCUMENTS

| | | | | |
|---|---|---|---|---|
| 6,776,261 | B2 * | 8/2004 | Eriksen | F16C 19/52 |
| | | | | 184/6.4 |
| 2010/0181739 | A1 * | 7/2010 | Eschenburg | B60C 23/003 |
| | | | | 280/124.125 |

FOREIGN PATENT DOCUMENTS

| | | | | |
|---|---|---|---|---|
| FR | 2673684 | A1 | | 9/1992 |
| FR | 2895470 | A1 * | 6/2007 | ........... B60C 23/003 |
| FR | 2895470 | A1 | | 6/2007 |
| GB | 2477816 | A | | 8/2011 |

* cited by examiner

PNEUMATIC SYSTEM FOR INFLATING A WHEEL, INTEGRATED TO A DRIVEN AXLE

GENERAL TECHNICAL FIELD

The invention relates to pneumatic supply systems for controlling the inflation condition of wheels of vehicles and inflating them.

More particularly, the invention relates to such systems within the scope of a wheel locally driven by a hydraulic machine with a rotating shaft.

STATE OF THE ART

The adjustment of the inflation of wheels is frequent on agricultural machines or building site machines for increasing or reducing the contact surface area with the ground.

On conventional axles, without any hydraulic machine, the supply of compressed air is accomplished through the fixed axis of the wheel spindle.

Within the scope of a wheel locally driven by a hydraulic machine with a rotating shaft, the wheel is driven into rotation by the shaft of the hydraulic machine, the shaft being borne by a rolling bearing. Therefore, for supplying compressed air as far as into the wheel, a connection between a fixed portion and a rotating connection is required.

Because of the conditions of use of such vehicles, the system has to be integrated.

Existing solutions imply architecture modifications which shift the wheel outwards or else weaken the existing components, notably by creating channels in the axle which may weaken the structure because of corrosion produced by compressed air (humidity, etc.).

PRESENTATION OF THE INVENTION

The presented invention aims at overcoming these different drawbacks, by proposing a system for pneumatically supplying a wheel comprising:
  a bearing support,
  a shaft extending along a longitudinal axis inside the bearing support and comprising a hub-forming end which extends radially, the shaft being configured so as to be driven into rotation by a hydraulic machine,
  at least one set of rolling bearings, positioned between the bearing support and the shaft for the rotation of said shaft in the bearing support around the longitudinal axis,
wherein the system further comprises:
  a chamber formed by the hub-forming end, the bearing support, a rolling bearing seal and a chamber seal,
  a primary channel crossing the bearing support and opening into the chamber,
  a secondary channel crossing the hub-forming end and opening into the chamber,
wherein:
  the rolling bearing seal, positioned longitudinally between the set of rolling bearings and the chamber, is in contact with the bearing support and the shaft for ensuring the seal between the shaft configured so as to be movable in rotation and the bearing support configured so as to be fixed,
  the chamber seal is in contact with the bearing support and with the hub-forming end for ensuring the seal between the hub-forming end configured so as to be movable in rotation and the bearing support configured so as to be fixed.

The invention is directed to giving the possibility of supplying a tire mounted on a vehicle wheel rim with compressed air. The chamber allows fluidic communication between the rotating parts and the fixed parts. The seals give the possibility of creating such a sealed chamber. Both channels have the role of transmitting the compressed air from the fixed bearing support as far as the rotating rim.

The invention also comprises the following features, taken alone or as a combination:
  the hub-forming end comprises a longitudinal extension which faces an end of the bearing support, said end of the bearing support thus being radially located between the shaft and the longitudinal extension,
  the chamber seal is radially positioned between the end of the bearing support and the longitudinal extension,
  the rolling bearing seal and the chamber seal are located in a same radial plane,
  the primary channel comprises a rectilinear channel portion longitudinally extending in the end of the bearing support and opening into the chamber,
  the system comprising a second channel portion extending parallel to the channel portion, so as to have portions with smaller sections,
  the secondary channel longitudinally crosses in the hub-forming end,
  the hub-forming end comprises an attachment area and the secondary channel connects the chamber to said attachment area,
  the secondary channel opens into the attachment area by forming an angle comprised between 30 and 60° with respect to the longitudinal axis,
  the secondary channel comprises a first portion longitudinally extending from the attachment area and a second portion connecting the chamber to the first portion,
  further comprising a protection seal radially positioned between the bearing support and the longitudinal extension for protecting the chamber seal, said chamber seal thus being located longitudinally between the chamber and the additional seal,
  the rolling bearings are lubricated with grease,
  the system comprises a second set of rolling bearings separated from the other set of bearings by a seal,
  the second set of bearings is lubricated with oil.

The invention also proposes an assembly comprising:
  a system as described earlier,
  means for supplying compressed air with a pipe, in order to provide compressed air,
  a wheel rim,
wherein:
  the wheel rim is secured to the hub-forming end,
  the pipe provides compressed air to the first channel,
  the wheel rim is supplied with air through the second channel, via the chamber.

The invention proposes a vehicle comprising an assembly as described earlier.

Said vehicles may be road machinery, but also agricultural machines or public works machines, and in the broadest sense, all the machines having a wheel (for example trucks, etc.) and which include supply of compressed air for a tire mounted on a wheel rim.

The invention finally proposes a method for assembling a system as described earlier, comprising steps:
  for fitting out a bearing support, for fitting out a shaft, for mounting the bearing support and the shaft, for assembling the bearing support and the shaft.

The method may comprise the following sub-steps:

the step for fitting out the bearing support comprises the setting into place of a rolling track of a metal seal of a protection seal, the step for fitting out the shaft comprises the setting into place of a chamber seal and of a rolling bearing seal, the setting into place of a rolling track and of the corresponding rolling bearing, the step for assembling the bearing support and the shaft comprises the setting into place of a shim and of an elastic ring.

PRESENTATION OF THE FIGURES

Figure 2:
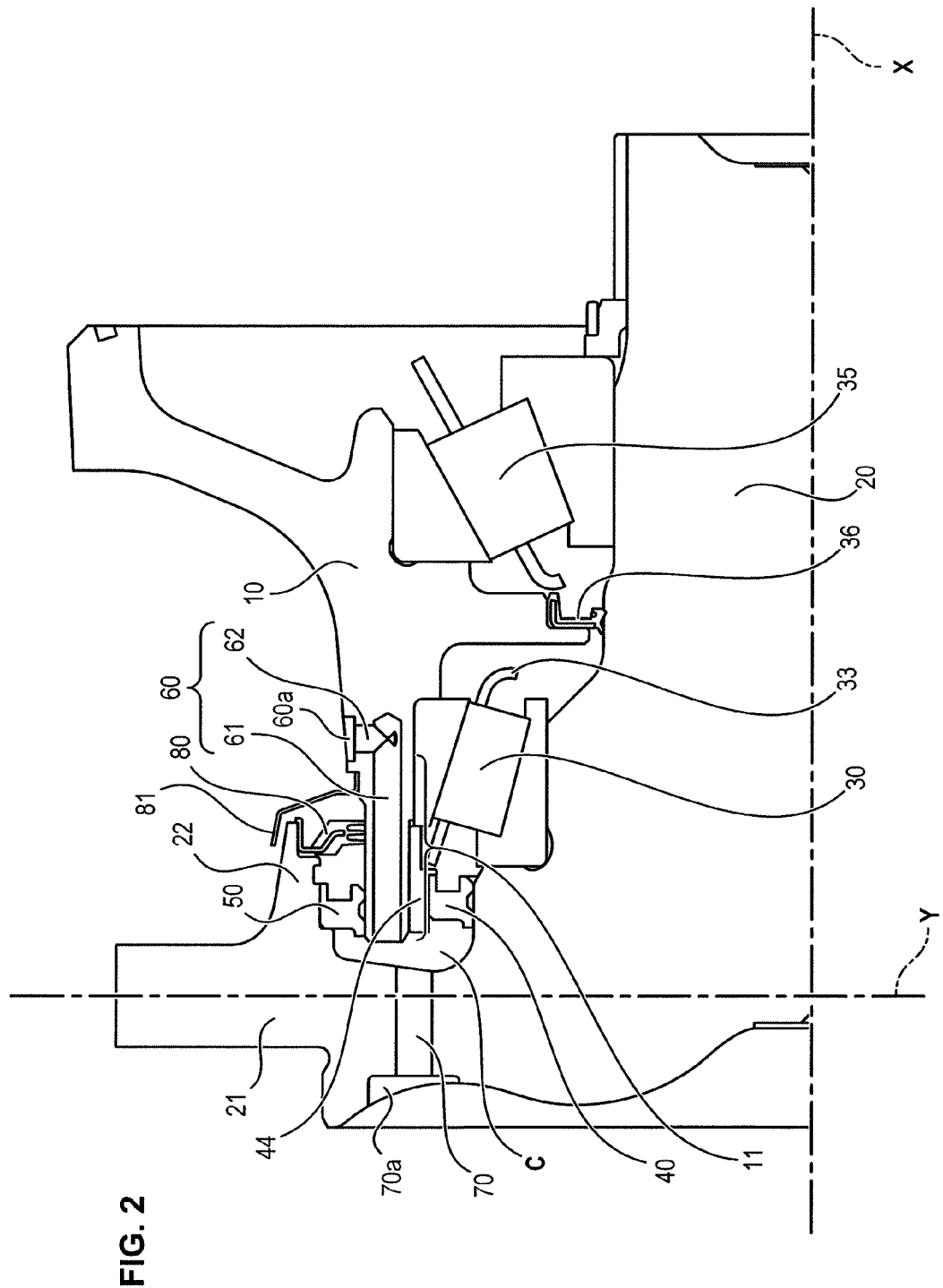
Figure 3:
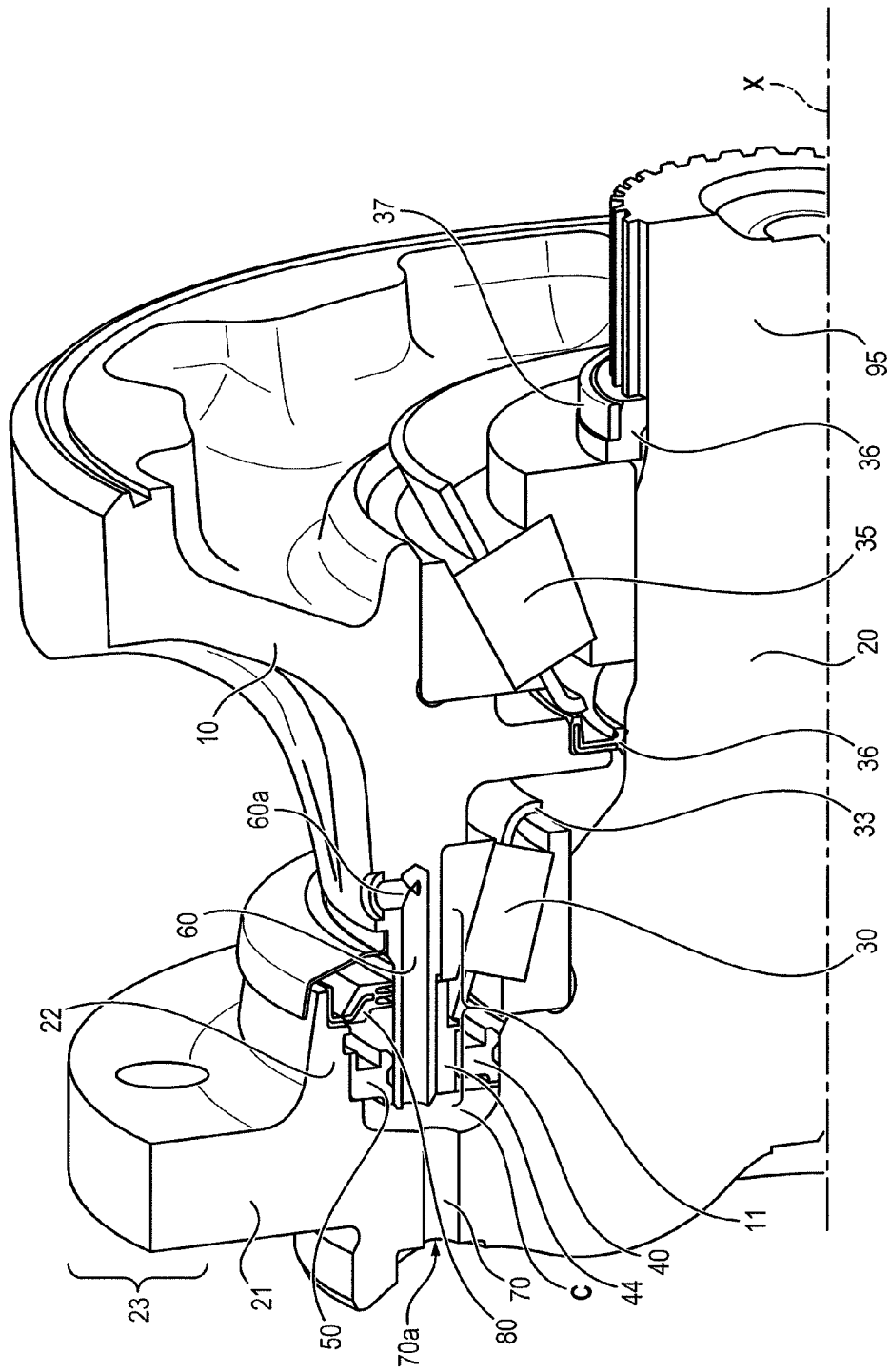
Figure 4:
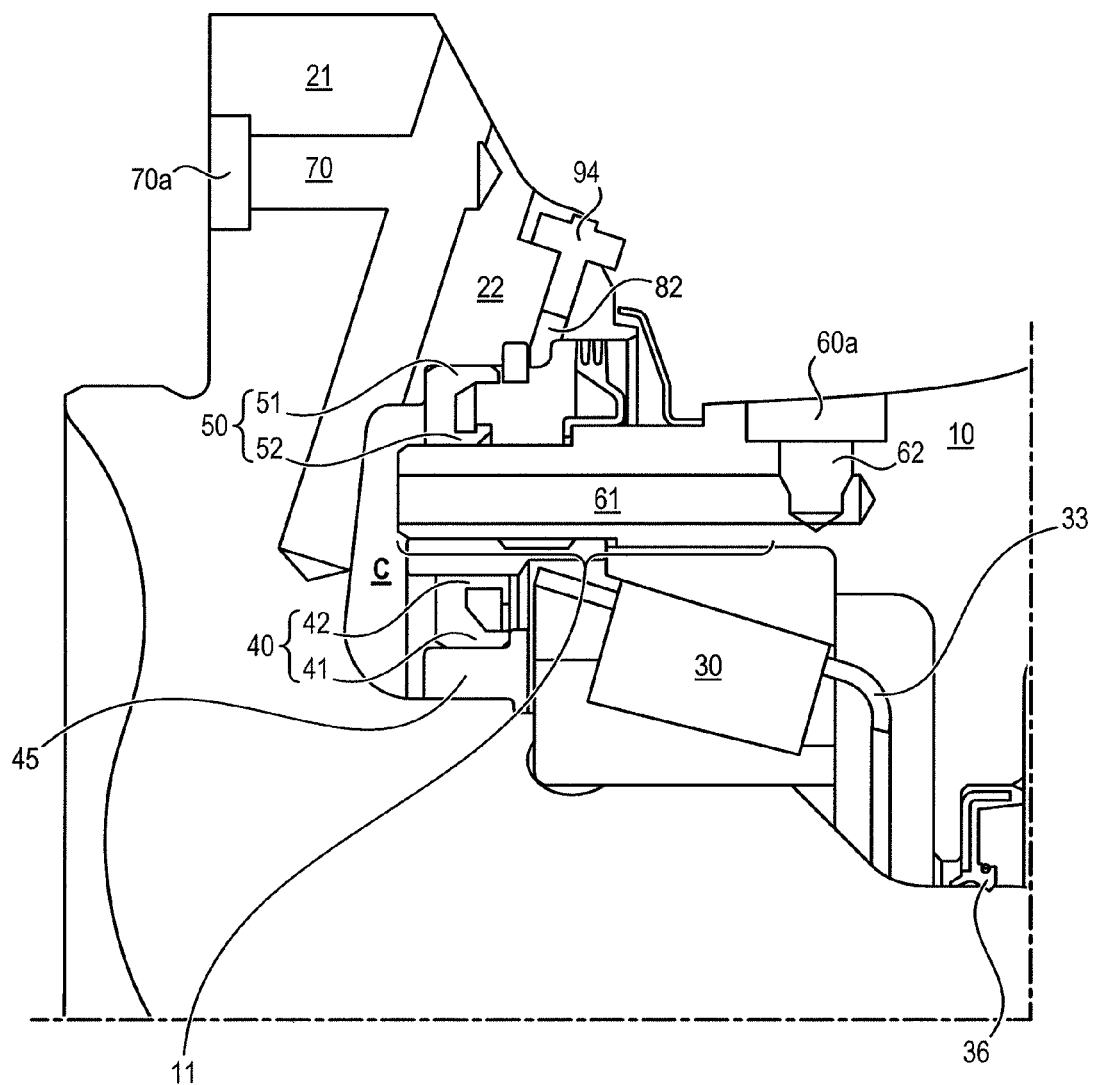
Figure 5:
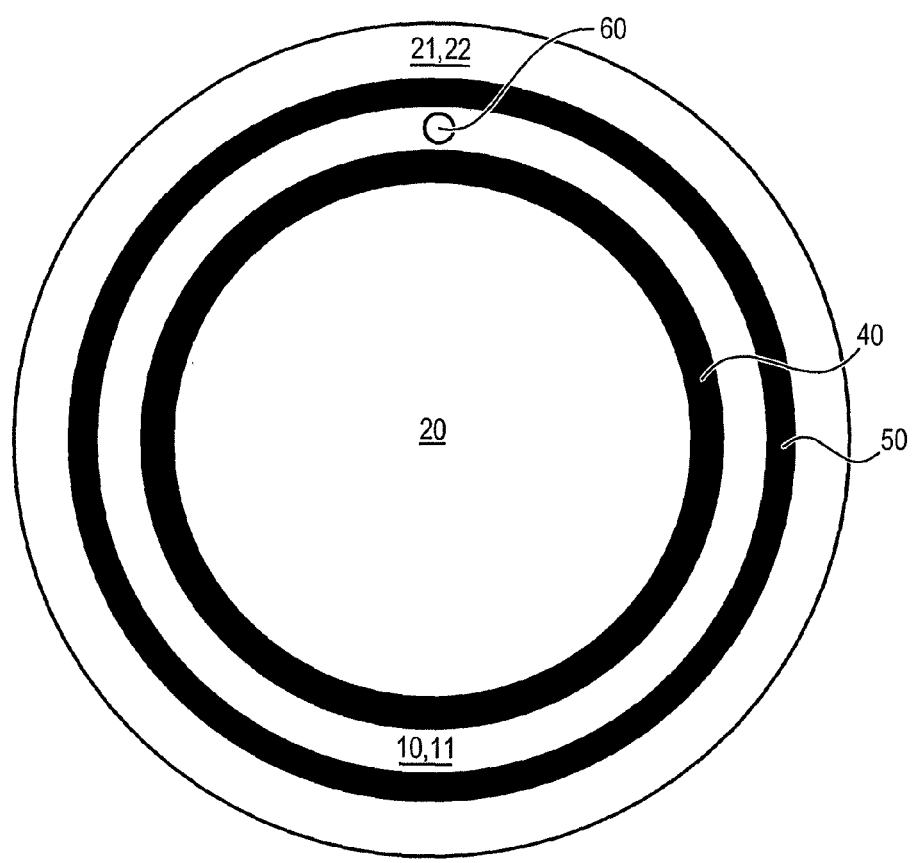
Figure 6:
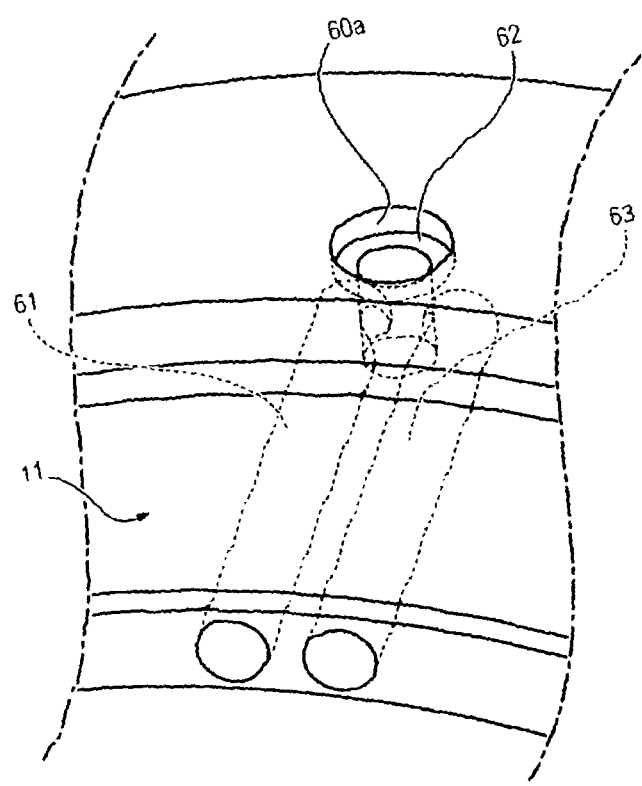
Figure 7:
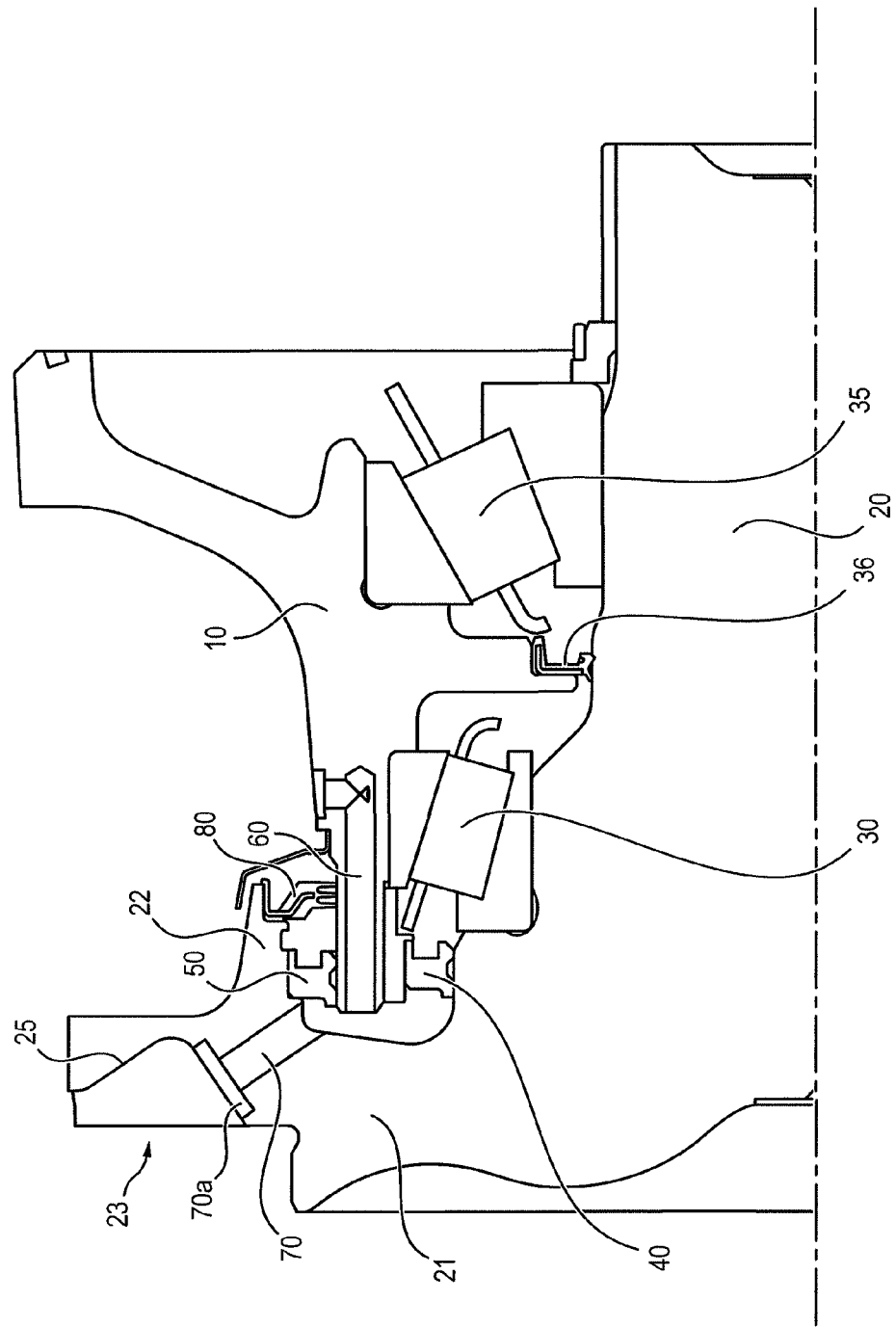
Figure 8:
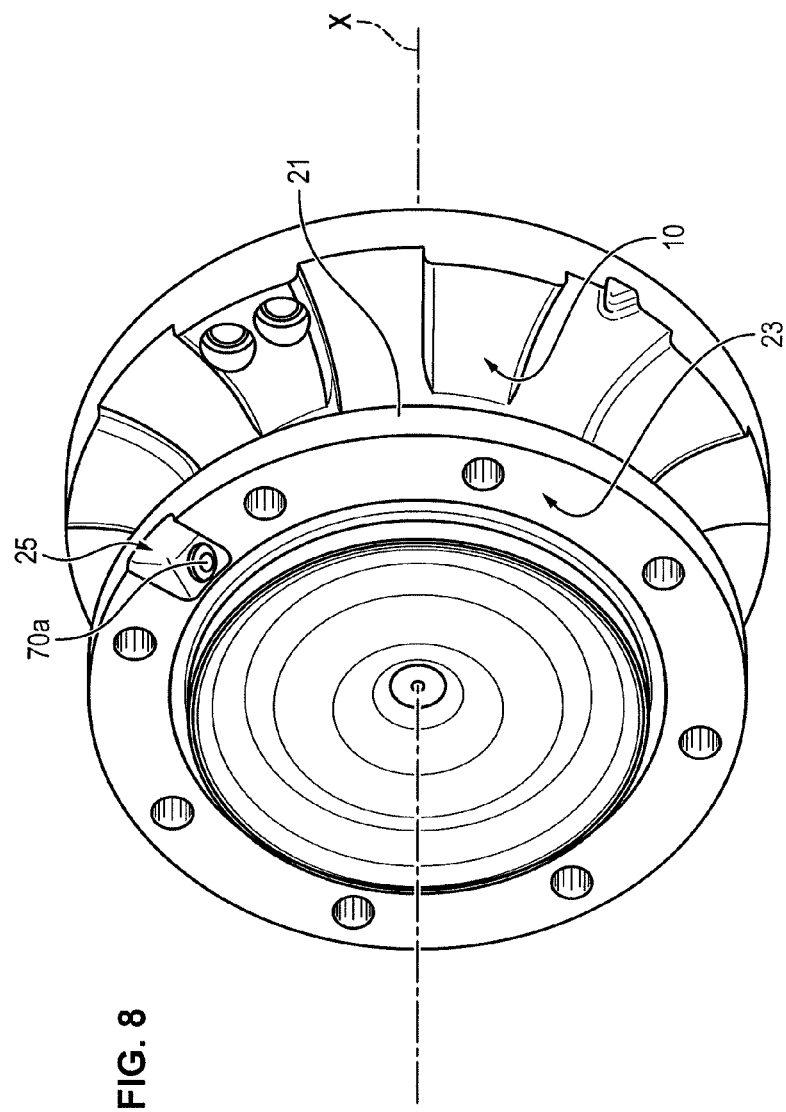
Figure 9:
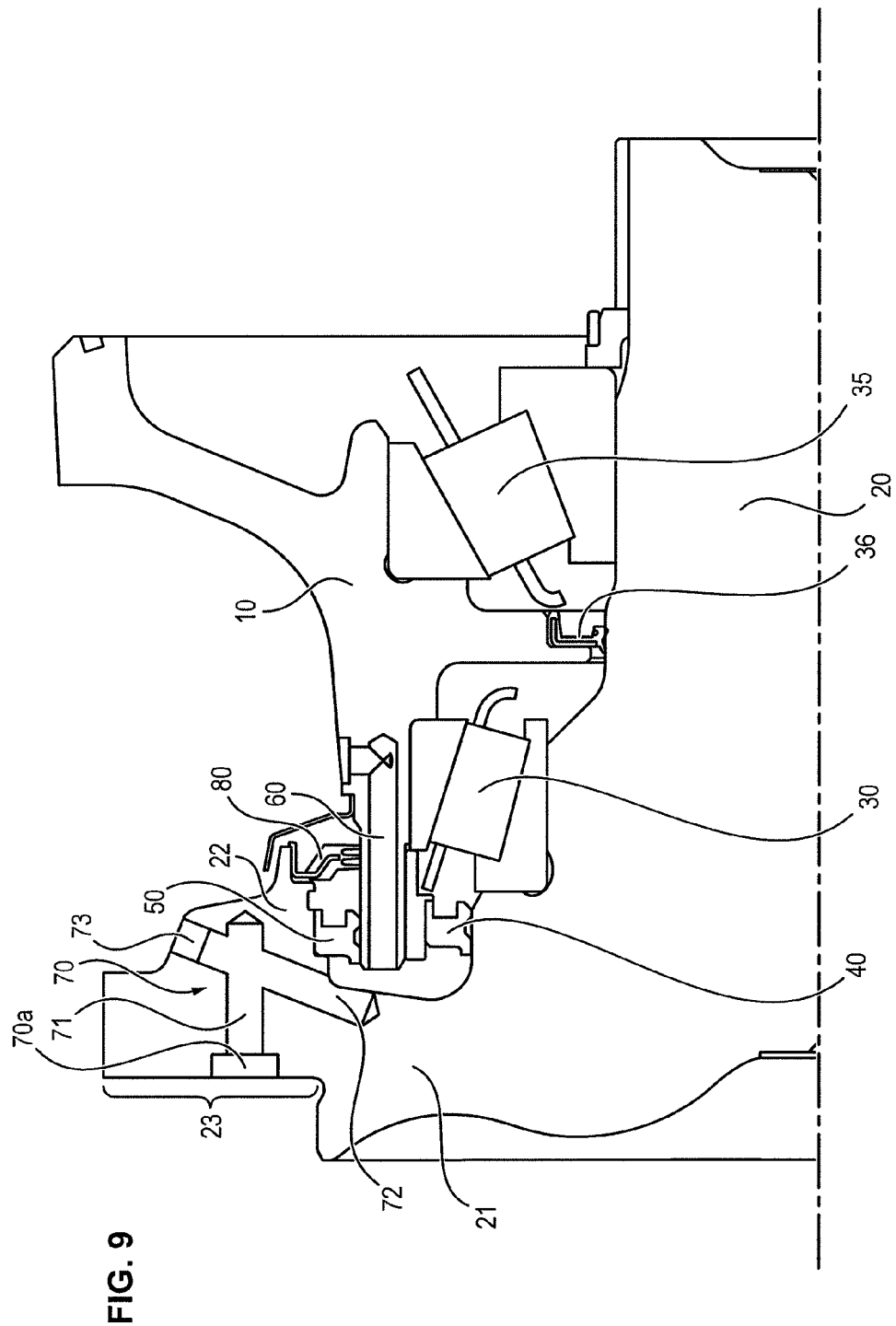
Figure 10:
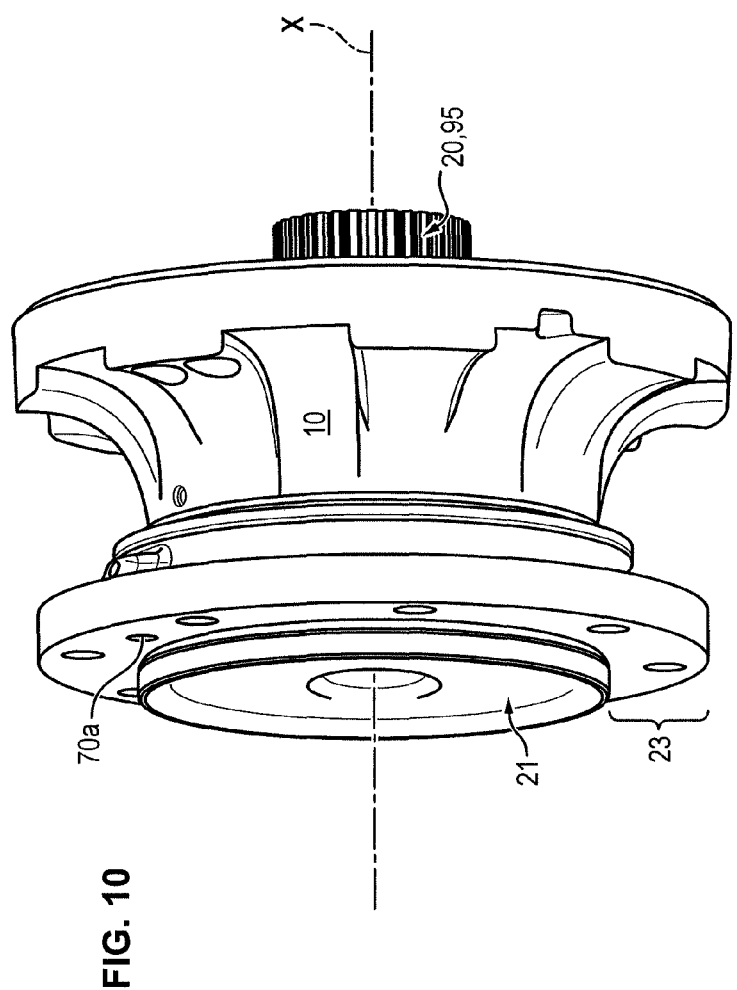
Figure 11:
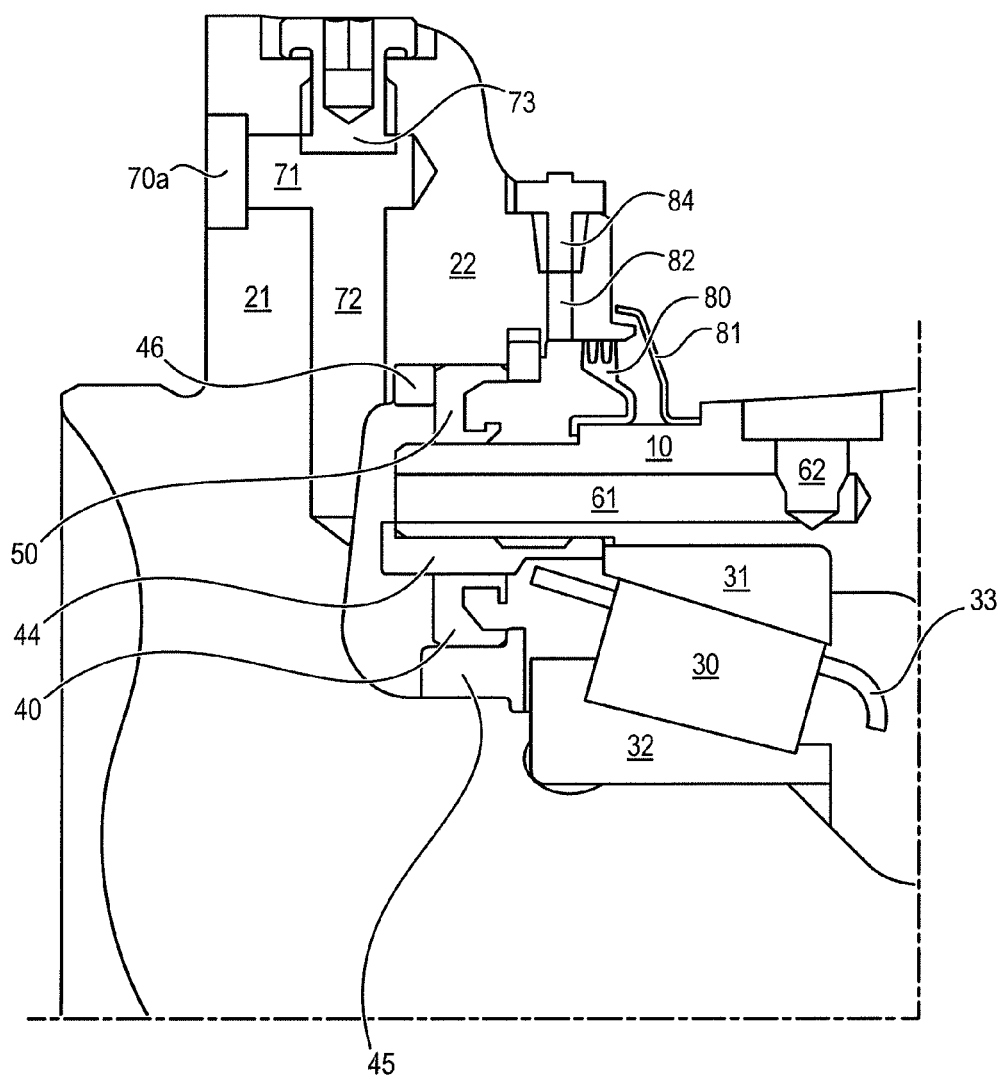
Figure 12:
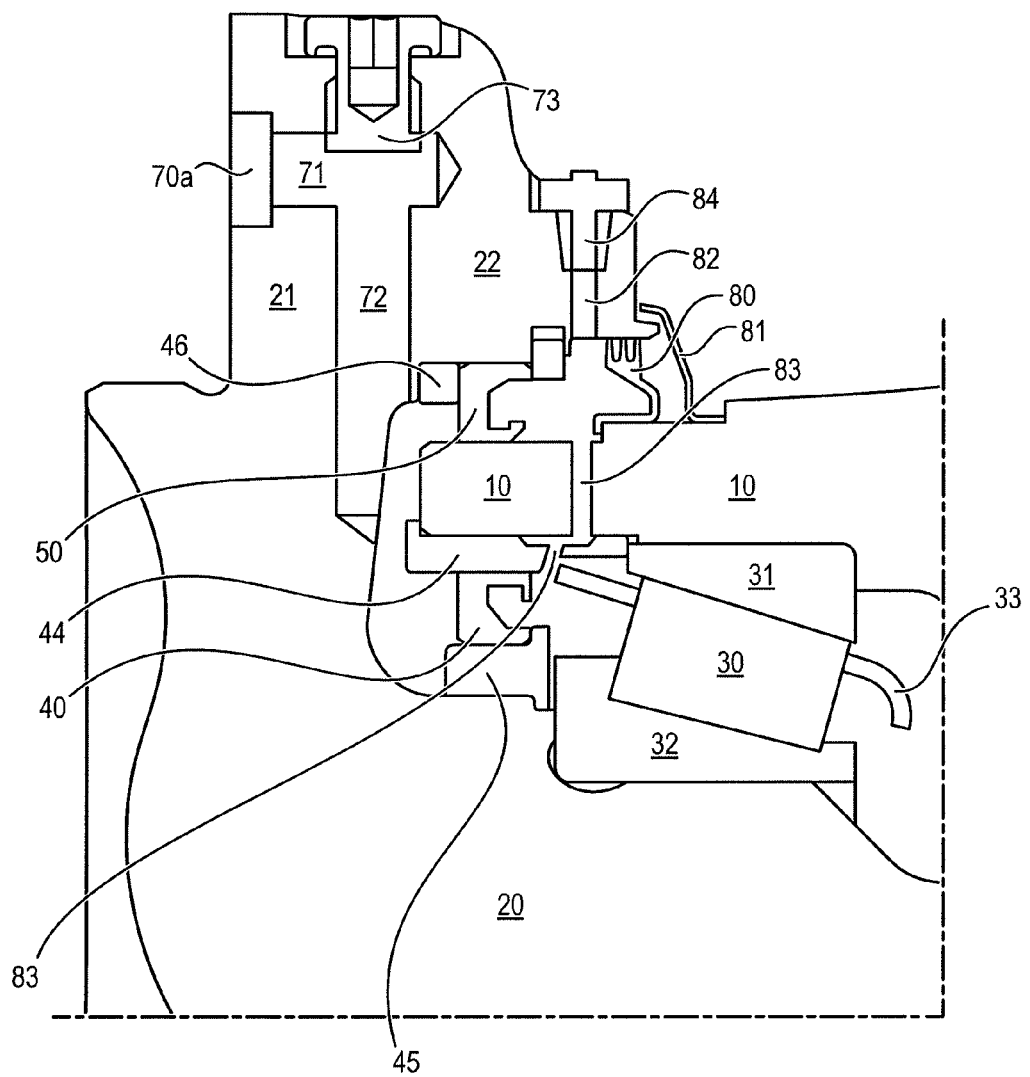
Figure 13:
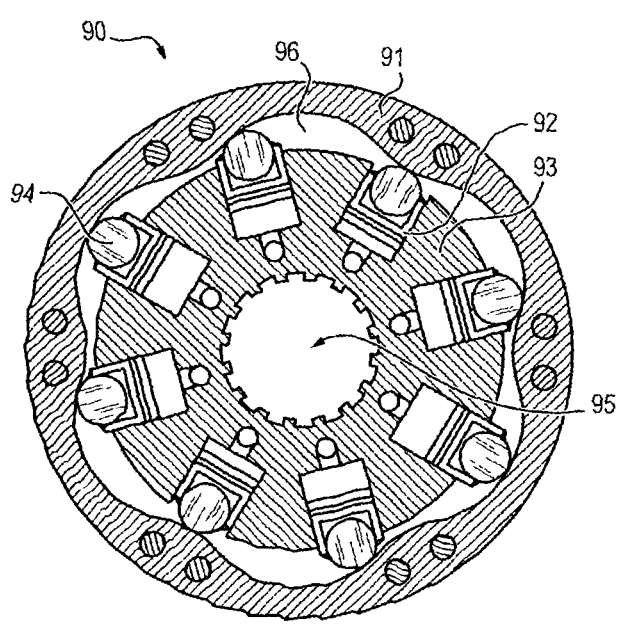
Figure 14:
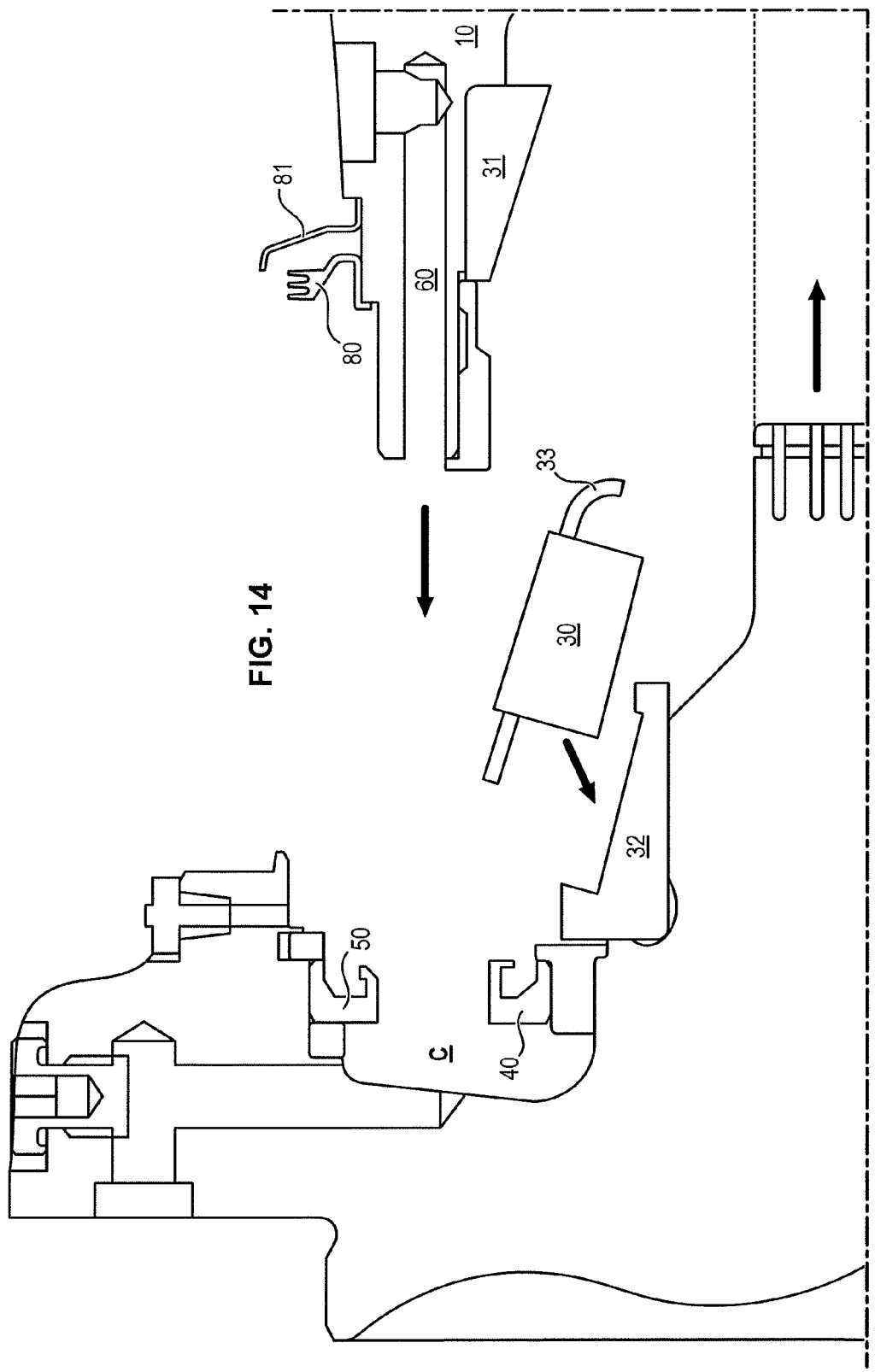

Other features, objects and advantages of the invention will become apparent from the description which follows, which is purely illustrative and non-limiting, and which should be read with reference to the appended drawings, wherein:

FIG. 1 illustrates a sectional view of an assembly comprising a system according to an embodiment of the invention as well as a wheel rim and means for providing compressed air, FIG. 2, illustrates a sectional view of a system according to this embodiment of the invention, FIG. 3 illustrates a three-dimensional view of a system according to this embodiment of the invention, FIG. 4 illustrates an enlarged view of an embodiment of the seals, FIG. 5 illustrates a sectional view along a plane orthogonal to the longitudinal axis of the seals, shafts, bearing support notably, FIG. 6 illustrates a three-dimensional enlargement of an embodiment of the primary channel, FIGS. 7 and 8 illustrate an embodiment of the secondary channel, FIGS. 9 and 10 illustrate another embodiment of the secondary channel, FIGS. 11 and 12 illustrate two embodiments of a valve for the rolling bearings, FIG. 13 illustrates a portion of a hydraulic machine with radial pistons, FIG. 14 illustrates different steps of an assembling method.

DETAILED DESCRIPTION

In connection with FIGS. 1 to 4, are illustrated a system 1 comprising a bearing support 10 as well as a shaft 20 which extends along a longitudinal axis X and which comprises a hub-forming end 21. The bearing support 10 has a general axisymmetrical shape inside which the shaft 20 is movable in rotation.

The hub-forming end 21 gives the possibility of attaching a wheel rim 2a bearing a tire 2b. For this purpose, the hub-forming end 21 extends radially, i.e. it has a dimension along a radial direction Y, orthogonal to the longitudinal axis X, greater than a dimension of the shaft 20 (outside the hub-forming end 21) along the same direction Y.

The system is mounted on a vehicle, for example an agricultural or building site vehicle, equipped with wheel rims 2a each bearing a tire 2b. The tire 2b may be inflated at different pressures. In particular, within the scope of the invention, the inflation of the tire 2b is accomplished by arrival of air at the wheel rim. The cooperation between the wheel rim 2a and the tire 2b is known and will not be described here.

Means for providing compressed air 5 give the possibility of supplying the system with compressed air, as this will be detailed subsequently.

The Bearing

The shaft 20 is a rotary shaft along the longitudinal axis X with respect to the bearing support 10. The bearing support 10 is thus defined to be fixed.

By fixed, is therefore meant, relatively to a vehicle reference system. However, even if the bearing support 10 does not perform any rotation related to the displacement of the vehicle, it may be movable in a reference system bound to the vehicle when it fits out a steered wheel. At least one set of rolling bearings is provided between the bearing support 10 and the shaft 20. The rolling bearing comprises rolling tracks and elements rolling on these tracks, like rollers, balls or any other equivalent means. The rolling elements may be accommodated in cages for maintaining them in position. In the illustrated example of roller bearings with rollers, tapered rollers 30 are supported on two rolling tracks 31, 32, one secured to the bearing support 10 and the other to the shaft 20. The roller bearing rollers are typically accommodated in cages 33.

The set of rolling bearings 30 is typically lubricated with grease. Grease allows better lubrication than oil. It operates better at high contact pressures, and allows better lifetime of the rolling bearings for very high loads on the bearings. Alternatively, in order to simplify the architecture of the system, the set of rolling bearings 30 may be lubricated with oil.

A second set of rolling bearings 35 may be provided, in order to form an "O" or "X" mounting. This set 35 also has its own rolling tracks. An inter-rolling bearing seal 36 may separate both sets of rolling bearings 30, 35 in order to allow each of them to have its own lubrication. For example, the second set 35 may be lubricated with oil from a hydraulic machine. Generally, the rolling bearings may be lubricated with oil, or with grease, or in a mixed way, some with oil and some with grease in the same machine.

Whatever the case, the rolling bearings which are lubricated with grease have to be separated from the oil contained in a case of the hydraulic machine 96 (see FIG. 1, 13) by a seal.

Alternatively, the tracks of the rollers 30 or 35 may be made in one piece with the bearing support 10 or the shaft 20.

Longitudinally, these elements are laid out in the following order: hub-forming end 21, set of rolling bearings 30, inter-rolling bearing seal 36, second set of rolling bearings 35, and then the hydraulic machine 3.

The shaft 20 is preferably driven into rotation by a hydraulic machine 3.

The hydraulic machine 3 will be presented at the end of the description.

The Chamber

In order to be able to supply the wheel rim 2a with compressed air in order to allow inflation of the tire 2b, the system 1 further comprises a chamber C formed by the hub-forming end 21, the bearing support 10 and two seals: a rolling bearing seal 40 and a chamber seal 50 (FIGS. 2, 3).

This chamber C, formed between rotating parts and fixed (non-rotating) parts, gives the possibility of producing the interface in the system for transmitting compressed air from the compressed air supply means 5 to the wheel rim 2a (FIG. 1).

Indeed, a primary channel 60 is provided, which crosses the bearing support 10 in order to open into the chamber C. This primary channel 60 comprises an admission orifice 60*a*, opening into the outer radial surface of the bearing support 10, on which is connected a pipe 4 connected to the compressed air supply means 5 (FIG. 1). Given that the admission orifice 60*a* is on the bearing support 10, it is fixed and may therefore be supplied with compressed air without any difficulty. The compressed air is thereby injected into the sealed chamber C by means of the seals 40, 50.

A secondary channel 70 is also provided, which crosses the hub-forming end 21 for opening into the chamber C. This secondary channel 70 comprises an outlet orifice 70*a* configured for opening into the portion of the hub-forming end 21, which is substantially located at the center or in the central portion of the wheel rim 2*a* (FIG. 1). The outlet orifice 70*a* contains in a known way sealing and attachment surfaces, typically a threading, for receiving a connector towards the tire 2*b* via the wheel rim. Given that the outlet orifice 70*a* is on the hub-forming end 21 which is rotating, the function of the chamber C is to provide a fluidic connection between the fixed elements of the system and the rotating elements.

A valve system for controlling the inflation (not shown in the figures) may be attached on the outlet orifice 70*a* in order to control the air flow rate intended to enter the tire.

An inflation orifice (not shown in the figures) present in the wheel rim, allows the inside of the tire to be put into communication with the outlet orifice 70*a*, notably via the inflation control valve, for example by means of a pipe (not shown in the figures). This pipe may be rigid and formed according to its trajectory, or flexible, or include a rigid portion and a flexible portion.

More generally, the control valve may be positioned anywhere on the air transmission chain between the outlet orifice 70*a* of the secondary channel 70 and the inflation orifice. The fluidic communications are then ensured by direct secured attachment, or through flexible pipes.

The seal is ensured by means of the seals 40, 50 which close the chamber C. Both seals 40, 50 have the shape of a circular seal.

The chamber C has a section along a plane orthogonal to the longitudinal axis X with the shape of a ring, or according to the selected plane, several concentric rings.

The Seals

The rolling bearing seal 40 ensures the seal of the cavity C at the shaft 20 and at the bearing support 10. It is located:
 radially between the bearing support 10 and the shaft 20 and
 longitudinally between the hub-forming end 21 and the rolling bearing 30.

The rolling bearing seal 40 is in contact both with the bearing support 10 and the shaft 20, for ensuring the seal of the cavity C during rotation of the shaft 20.

The chamber seal 50 ensures the seal of the cavity C at the hub-forming end 21 and at the bearing support 10.

In a preferred embodiment, the bearing support 10 comprises an end 11 and the hub-forming end 21 comprises a longitudinal extension 22 which longitudinally faces the end 11 of the bearing support 10. In this way one obtains that the end 11 of the bearing support 10 is radially located between the shaft 20 and the longitudinal extension 22 of the hub-forming end 21.

The end 11 of the bearing support 20 has the shape of a cylindrical barrel which will be accommodated inside a circular groove formed in the hub-forming end 11. The groove, which comprises an internal radial face 21*a*, an axial face 22*b* and an external radial face 21*c*, opens onto the bearing support 20.

In this configuration, the chamber seal 50 is advantageously positioned between the end 11 of the bearing support 10, i.e. on the external radial face 21*c* and the longitudinal extension 22. It ensures the seal of the cavity C between the rotary longitudinal extension 22 and the end 11 of the fixed (non-rotary) bearing support 10.

Advantageously, both seals 40, 50 are located in a same radial plane or substantially in a same radial plane, i.e. in a same, or substantially in a same, plane orthogonal to the longitudinal axis.

According to a sectional view of the system shown in FIG. 5 (a figure not to scale) the shaft 20, the rolling bearing seal 40, the end 11 of the bearing support 10, the chamber seal 50 and the longitudinal extension 22 are again found in a same plane, orthogonal to the longitudinal axis X. The seals 40, 50 are radially framed by the shaft 20 and the bearing support 10, or the shaft 20 and the longitudinal extension 22.

By substantially in a same plane, is meant that there exists a radial sectional plane in which both seals are visible.

A seal support 44 of the fret type may be positioned between the rolling bearing seal 40 and the bearing support 10 and a blocking support 45 may be positioned between said seal 40 and the shaft 20 (internal radial face 21*a*).

A shim 46 may be positioned in the chamber C, in contact with the chamber seal C, in order to block it longitudinally.

These arrangements of supports 44, 45 and of shim 46 are only required insofar that the device is not specially designed for having the chamber C and the seals 40, 50.

In particular, as illustrated in FIG. 3, the seal support 44 is positioned between the rolling bearing seal 40 and the bearing support 10. Such a support 44 allows implementation of a standard seal on specific architectures, themselves also stemming from a standard system without any pneumatic supply.

Preferentially, as illustrated in FIG. 4, the seals 40, 50 are of the lip ring type, which are adapted for rotary parts. In an embodiment, the seals 40, 50 each comprise a trim 41, 51, in fixed contact with the shaft 20 and the hub-forming end 21 (or the seal support 41 if necessary) respectively, and a sealed lip 42, 52, which is in friction with the bearing support 10 (or the seal support 41 if necessary) and allows the sealing of the cavity C in spite of the rotation. Both seals 40, 50 are secured to the rotary portions and are therefore in rotation with respect to the bearing support 10. This embodiment is practical for assembling and mounting the machine.

Nevertheless, one of the two seals 40, 50 may not be rotary (see FIG. 2 for example) and may be secured to the bearing support 10.

The trim and the sealed lip are connected together by a thinner intermediate offset portion on one of the edges of the trim and of the lip, thereby defining a recessed portion at the opposite edge between the trim and the lip. This recessed portion forms, in a sectional plane illustrated in the figures, a C. According to an embodiment, the recessed portion faces the chamber C, according to another embodiment, the recessed portion faces the rolling bearings.

Additionally, a protection ring may be combined with each lip seal.

Primary Channel

According to a preferred embodiment, the primary channel 60 comprises a rectilinear channel portion 61 which extends longitudinally or substantially longitudinally with respect to the longitudinal axis X in the end 11 of the bearing support 10. The channel portion 61 opens into the chamber C.

In order to be able to connect the channel portion 61 to the admission orifice 60a, a rectilinear conduit 62 is provided. The latter extends radially, or substantially radially, i.e. orthogonal or substantially orthogonal to the longitudinal axis X.

The admission orifice 60a contains attachment means not shown, for example a threading and sealing means, for connecting it to the pipe 4 in a known way.

The layout of the primary channel 60 in a rectilinear channel portion 61 and a rectilinear conduit 62 which overlap in the bearing support 10 allows them to be formed in the bearing support 10 by simple drilling. In order to limit the shrinkage of material of the bearing support, the length of the primary channel 60 is preferably a minimum.

By resorting to drilling, it is thus not necessary to modify the foundry molds.

According to an embodiment shown in FIG. 6, the primary channel 60 may comprise a second channel portion 63 fluidically in parallel with the one mentioned earlier. Both channel portions 61, 63 open into the cavity C and are then separated by a distance of less than the diameter of the conduit 62, so as to be able to also open into the conduit 62. As illustrated in FIG. 6, communication is accomplished by intersection of several cylinders corresponding to the portions 61, 63 and to the conduit 62. In the case shown in FIG. 6, both portions 61, 63 are geometrically parallel.

By having two channel portions 61, 63, it is possible to reduce their diameter comparatively to a single portion 61, for constant air flow. The bearing support 10 is a part subject to strong stresses (it notably bears the weight of the vehicle) and it may be desirable to minimize the volume of each recess.

Alternatively, it is possible to provide a conduit 62 for each of the respective portions 61, 63, but then a duplication of the pipe 4 has to be provided, which complicates the making of the system and increases the amount of material to be scooped out. Nevertheless, by having two channel portions 61, 63, it is possible to limit the scooping out of material radially. This gives the possibility of having a more resistant or thinner, bearing supporting part 10, in order to let through the required air flow.

The Secondary Channel

Several embodiments of the secondary channel will now be described. An attachment area 23 is defined on the hub-forming end 21 (see FIG. 1). This area corresponds to a radial planar area (with respect to the longitudinal axis X) of the hub on which the wheel rim 2a is secured. Generally, it gives the possibility of receiving a set of bolts 24 regularly distributed in a ring crossed in its center by the longitudinal axis X.

As illustrated in FIG. 2 for example, the secondary channel 70 may be made as a rectilinear channel longitudinally extending or substantially longitudinally extending along the longitudinal axis X. By the architecture of the hub-forming end 21 and of the attachment area 23 which is radially further away than the chamber C, the outlet orifice 70a of the channel 70 is radially found between the longitudinal axis X and the attachment area 23.

As illustrated in FIGS. 7 and 8, the secondary channel 70 may be made as a rectilinear channel obliquely extending by radially diverging with respect to the longitudinal axis X in order to open at the attachment area 23, i.e. the outlet orifice 70a is found in this area 23. A recess 25 is formed in the attachment area 23 so as to allow the outlet orifice 70a to be in the extension of the rectilinear channel 70 without however being in the planar area of the attachment area 23.

By "obliquely", is meant that in a sectional plane comprising the longitudinal axis X, the channel extends along an angle comprised between 10 and 80°, and more specifically between 30 and 60°.

Alternatively, as illustrated in FIGS. 9, 10 and 11, 12, the secondary channel 70 may comprise a first portion 71 longitudinally extending from the attachment area 23. The outlet orifice 70a is in the radial planar area of the attachment area. The secondary channel 70 also comprises a second portion 72 which connects the first portion 71 to the chamber C.

For design reasons, the second portion 72 crosses the hub-forming end 21 as far as the chamber C, by joining the first portion 71 in said hub-forming end 21. An internal radial end of said portion 72 thus opens into the chamber C and an external radial end of said portion 72 opens onto an external radial surface of the hub-forming end 11, said second portion 72 being secant with the first portion 71. Indeed, the portions are preferably made by drilling, and not by foundry molding. The portions are preferably rectilinear. The second portion 72 may be oblique with respect to the longitudinal X or orthogonal extension.

A plug 73 is provided at the external radial end of the second portion 72 for sealing the secondary channel 70 and allowing compressed air from the chamber C to attain the outlet orifice 70a.

The primary and secondary channels are preferably never aligned, so as to avoid direct circulation of the air and to maintain a buffering role of the cavity C, for possibly absorbing temporary overpressures. In this way, when the channel portion 61 and the secondary channel 70 extend rectilinearly parallel to the longitudinal axis X, the latter are positioned at different radial distances.

Other Elements

In order to protect the chamber seal 50, a protection seal 80 may be provided. When it is positioned, the chamber seal 50 is located between the chamber C and the protection seal 80 which prevents water, dust, etc. from coming into contact with said chamber seal 50.

More specifically, according to an embodiment, the protection seal 80 is positioned radially between the bearing support 10 and the longitudinal extension 22 for protecting the chamber seal 50 (FIG. 2).

This is typically a lip ring seal, already used in the bearings for protecting them from the outside environment.

The protection seal 80 is fixed.

Further, a metal seal as a metal sheet 81 is positioned radially outside on the bearing support 10 and extends towards the extension 22 so as to partly overlap it, without touching it. This metal sheet 81 gives the possibility of protecting the protection seal from a direct burst.

It is possible that the seals 40, 50 have a few leaks, promoted when the means for providing compressed air 5 malfunction and cause overpressures in the chamber C. These seals may then jump out of their accommodation or be torn, thus allowing dirt to pass into the grease. In particular, if the inter-rolling bearing seal 36 is damaged, there may then be a risk of a grease leak towards the case of the engine lubricated with oil. Indeed, the inter-rolling bearing seal 36 is in fluidic communication with the volume between the rolling bearing seal 40 and the first set of rolling bearings 30.

In order to find a remedy to this, a device is provided for giving the possibility of setting the spaces around the seals 40, 50 to atmospheric pressure, as well as the space around the rolling bearings 30, 35. As illustrated in FIGS. 11, 12, a first drill hole 82 may be provided in the longitudinal extension 22. This drill hole 82, from an outer surface to the hub-forming end 21 opens between the chamber seal 50 and the protection seal 80. A second drill hole 83 may be provided in the end 11 of the bearing support 10, and also if necessary, the seal support 44 of the fret type, in order to open into the region around the rolling bearings 30. Fluidic communication 82, 83 is then provided between this region and the outside which is at atmospheric pressure, via both drill holes 82, 83. A discharge chamber is thereby defined which allows discharge of the overpressures of the chamber C.

The drill hole 83 in the bearing support 10 and in the fret 44 is not necessarily rectilinear, i.e. there may be a shift, for example if a space exists as a circular groove, or groove, between the fret 44 and the bearing support 10. Said groove may be made in the fret or in the bearing support 10. In a known way, this groove may allow communication between the end 11 of the bearing support 10 and the drill hole in the fret 44, even if they are not facing each other radially, and to a lesser extent axially.

A valve 84, which acts as an anti-return valve, obturates the first drill hole 82 so as to both allow discharge of the overpressures but also prevent dirt from penetrating through the first drill hole 82. The valve 84 is tared to the intended pressure. In particular, the taring of the valve 84 is sufficiently low so that the pressure for deterioration of the seals, notably the inter-rolling bearing seal 36, is not attained.

In order to avoid interferences with the portion 61 of the primary channel 60, the second drill hole 83 is made in another plane than the portion, so that there is no fluidic communication between the primary channel 60 and the second drill hole 83. FIG. 11 illustrates a sectional view in the plane of the primary channel 60, therefore, the second drill hole 83 is not visible. FIG. 12 illustrates a sectional view of the bearing support 10 in the plane of the drill hole 83.

The Compressed Air Supply Means

They may assume several forms.

Notably, these means 5 may be made with:
- a compressor dimensioned for providing the air flow and the pressure required for inflating a tire 2b borne by the wheel rim 2a. It is generally powered by a motor (not shown in the figures),
- a compressed air tank.

Such pieces of equipment for providing compressed air are very common on wheeled machines and vehicles. They may be used in a known way for varying the pressure of the tires depending on the nature of the ground, or of a height of the vehicle. They may be dedicated to inflation of the wheels, or be shared with other pieces of pneumatic equipment, such as a suspension system with air cushions. They may be mechanically connected to the main motor of the machine or of the vehicle, or be driven by means of a dedicated machine. This dedicated machine may advantageously be an electrical machine and powered by the electric network of the machine or of the vehicle, and be driven by a control unit.

The pipe 4 allows transfer of compressed air as far as the admission orifice 60a of the primary channel 60.

The pipe 4 is preferably flexible since the bearing supports 10 may be part of a steered wheel (typically the front wheels of a vehicle), or of a movable wheel relatively to the chassis, by means of a suspension system.

The Hydraulic Machine

With reference to FIG. 13, the hydraulic machine 3 is preferentially a machine with radial pistons 90 comprising:

- a lobed cam 91, notably a multi-lobed cam,
- a plurality of pistons 92 radially positioned in a cylinder block 93, the pistons 92 each comprising a roller 94 which may roll on the lobed cam 91,
- a machine shaft 95, which may be secured to the cylinder block 93.

This type of machine may be actuated or disabled by retraction of the pistons 92 in the block 93, or by engagement or disengagement of the block 93 with respect to the machine shaft 95.

Such a machine converts hydraulic energy into mechanical energy by the variation of the cylinder capacities of the pistons when they roll on the lobed cam.

Such a machine, if it is of the type with multilobed cams, has relatively low speeds of rotation but has a high torque.

This machine rotates at the speed of the wheels.

A case (not shown) and a lid protect the assembly. In a known way, the case comprises normally unpressurized oil. The case ensures collection of the leaks of the machine, and this oil flow ensures lubrication and cooling of the machine. However, the case may be set to a low pressure in order to retract the pistons and disable the machine. The machine is connected to a supply line, a return line and a case draining line.

The machine may be of the type when the rolling bearings are in grease, or else of the type when a rolling bearing is in grease, and the other one in oil, or else of the type when both rolling bearings are in grease. If one of the rolling bearings is in grease, the machine includes an isolating seal between grease and oil.

In particular, the machine shaft 95 may be secured in rotation to the shaft 20 or else, as this is the case in the figures, forming a single and same part with the shaft 20.

The bearing supports 10 are typically secured to the case and/or to the lid.

A gear reducer may be placed between the block and the output shaft.

In this case, the hydraulic machine is preferentially a so-called rapid hydraulic machine with axial pistons, or a machine with radial pistons and a cam with a single lobe. In this case, the machine rotates faster than the wheels.

Now, an assembling method will be described (FIG. 14).

In a first step for fitting out the bearing, the bearing support 10 is equipped with a rolling track 31 secured to the bearing support 10. This track 31 may be maintained in place by the seal support 44 of the fret type.

In a second step for fitting out the bearing, the metal seal 81 and the protection seal 80 are laid, as well as the inter-rolling bearing seal 36.

In a step for equipping the shaft 20:
- the rolling bearing seal 40 is positioned on the shaft 20, with or without the seal support 44 and/or the shim support 45,
- the chamber seal 50 is laid on the hub-forming end 21,
- the rolling track 32 of the shaft 20 is driven onto the shaft,
- the rolling bearings 30 and the cage 33 are laid on the shaft.

Next, the bearing support 10 is laid on the thereby fitted-out shaft 20.

The tracks of the second set of rolling bearing 35 may then be set into place.

Finally, in a following step, a shim 37 and an elastic ring 38 are placed in the ring-shaped groove extending on a periphery of the shaft (not shown) outside the rolling bearings 30, 35. When the hydraulic machine 3 is set into place, the shim 37 and the elastic ring 38 are longitudinally found between the machine 3 and the rolling bearings 30, 35.

The resistance of the machine shaft 95, or of the shaft 20 according to the embodiments, in the hydraulic machine 3, is thus improved.

When the shaft 20 comprises longitudinal splines ("splined shaft") for achieving transmission of torque between the cylinder block 93 and the shaft 20, 90, the groove is machined transversely to these splines.

The invention claimed is:

1. A system for pneumatically supplying a wheel comprising:
   a bearing support (10),
   a shaft (20) extending along a longitudinal axis (X) inside the bearing support (10) and comprising a hub-forming end (21) which extends radially (Y), the shaft being configured so as to be driven into rotation by a hydraulic machine,
   at least one set of rolling bearings (30), positioned between the bearing support (10) and the shaft (20) for the rotation of said shaft in the bearing support around the longitudinal axis,
   characterized in that the system further comprises:
   a chamber (C) formed by the hub-forming end (21), the bearing support (10), a rolling bearing seal (40) and a chamber seal (50),
   a primary channel (60) forming in the bearing support (10) and opening into the chamber (C),
   secondary channel (70) crossing the hub-forming end (21) and opening into the chamber (C),
   wherein:
   the rolling bearing seal (40), positioned longitudinally between the set of rolling bearings (30) and the chamber (C), is in contact with the bearing support (10) and the shaft (20) for ensuring the seal between the shaft (20) configured so as to be movable in rotation and the bearing support (10) configured so as to be fixed,
   the chamber seal (50) is in contact with the bearing support (10) and with the hub-forming end (21) for ensuring the seal between the hub-forming end (21) configured so as to be movable in rotation and the bearing support (10) configured so as to be fixed,
   the hub-forming end (21) comprises a longitudinal extension (22) which will face an end (11) of the bearing support (10), said end (11) of the bearing support (10) thus being radially located between the shaft (10) and the longitudinal extension (22),
   the chamber seal (50) is radially position between the end (11) of the bearing support (10) and the longitudinal extension (22).

2. The system according to claim 1, wherein the rolling bearing seal (40) and the chamber seal (50) are located in a same radial plane.

3. The system according to claim 1, wherein the primary channel (60) comprises a rectilinear channel portion (61) longitudinally extending in an end (11) of the bearing support (10) and opening into the chamber (C).

4. The system according to claim 3, comprising a second channel portion (63) extending parallel to the channel portion (61), so as to have portions with smaller sections.

5. The system according to claim 1, wherein the secondary channel (70) longitudinally crosses in the hub-forming end (21).

6. The system according to claim 1, wherein the hub-forming end (21) comprises an attachment area (23) and the secondary channel (70) connects the chamber (C) to said attachment area (23).

7. The system according to claim 6, wherein the secondary channel (70) opens into the attachment area (23) by forming an angle comprised between 30 and 60° with respect to the longitudinal axis (X).

8. The system according to claim 1, wherein the secondary channel (70) comprises a first portion (71) longitudinally extending from the attachment area (23) and a second portion (72) connecting the chamber (C) to the first portion (71).

9. The system according to claim 1, further comprising a protection seal (80) radially positioned between the bearing support (10) and the longitudinal extension (22) for protecting the chamber seal (50), said chamber seal (50) thus being located longitudinally between the chamber (C) and the protection seal (80).

10. The system according to claim 1, wherein the rolling bearing (30) is lubricated with grease.

11. A method for assembling a system according to claim 1, comprising the steps:
    for fitting out the bearing support (10),
    for fitting out the shaft (20),
    for mounting the bearing support (10) and the shaft (20),
    for assembling the bearing support (10) and the shaft (20).

12. The method according to claim 11, wherein:
    the step for fitting out the bearing support comprises the setting into place of a rolling track (31), of a metal seal (81), of a protection seal (80),
    the step for fitting out the shaft comprises the setting into place of the chamber seal (50) and of the rolling bearing seal (40), the setting into place of a rolling track (32) and of the corresponding rolling bearing (30),
    the step for assembling the bearing support (10) and the shaft (20) comprises the setting into place of a shim (37) and of an elastic ring (38).

13. An assembly comprising:
    a system for pneumatically supplying a wheel including:
    a bearing support (10),
    a shaft (20) extending along a longitudinal axis (X) inside the bearing support (10) and comprising a hub-forming end (21) which extends radially (Y), the shaft being configured so as to be driven into rotation by a hydraulic machine,
    at least one set of rolling bearings (30), positioned between the bearing support (10) and the shaft (20) for the rotation of said shaft in the bearing support around the longitudinal axis,
    a chamber (C) formed by the hub-forming end (21), the bearing support (10), a rolling bearing seal (40) and a chamber seal (50),
    a primary channel (60) forming in the bearing support (10) and opening into the chamber (C),
    a secondary channel (70) crossing the bub-forming end (21) and opening into the chamber (C),
    means for providing compressed air (5) with a pipe (4), for providing compressed air,
    a wheel rim (2),
    wherein;
    the roiling bearing seal (40), positioned longitudinally between the set of roiling bearings (30) and the chamber (C), is in contact with the bearing support (10) and the shaft (20) for ensuring the seal between the shaft (20) configured so as to be movable in rotation and the bearing support (10) configured so as to be fixed,
    the chamber seal (50) is in contact with the bearing support (10) and with the hub-forming end (21) for ensuring the seal between the hub-forming end (21) configured so as to be movable in rotation and the bearing support (10) configured so as to be fixed the hub-forming end (21) comprises a longitudinal extension (22) which will face an end (11) of the bearing support (10), said end (11) of the beating support (10) thus being radially located between the shaft (10) and the longitudinal extension (22), the chamber seal (50) is radially positioned between the end (11) of the bearing support (10) and the longitudinal extension (22), the wheel rim (2) is secured to the hub-forming end (21), the pipe (4) provides compressed air to the primary channel (60), the wheel rim (2) is supplied with air through the second channel (70), via the chamber (C), the rolling bearing seal (40) and the chamber seal (50) are located in a same radial plane, and the assembly further including a protection seal (80) radially positioned between the bearing support (10) and the longitudinal extension (22) for protecting the chamber seal (50), said chamber seal (50) thus being located longitudinally between the chamber (C) and the protection seal (80).

14. A vehicle comprising the assembly according to claim 13.

* * * * *